A. CRUME.
BEET HARVESTER.
APPLICATION FILED JUNE 25, 1918.
1,303,857.
Patented May 20, 1919.
3 SHEETS—SHEET 1.
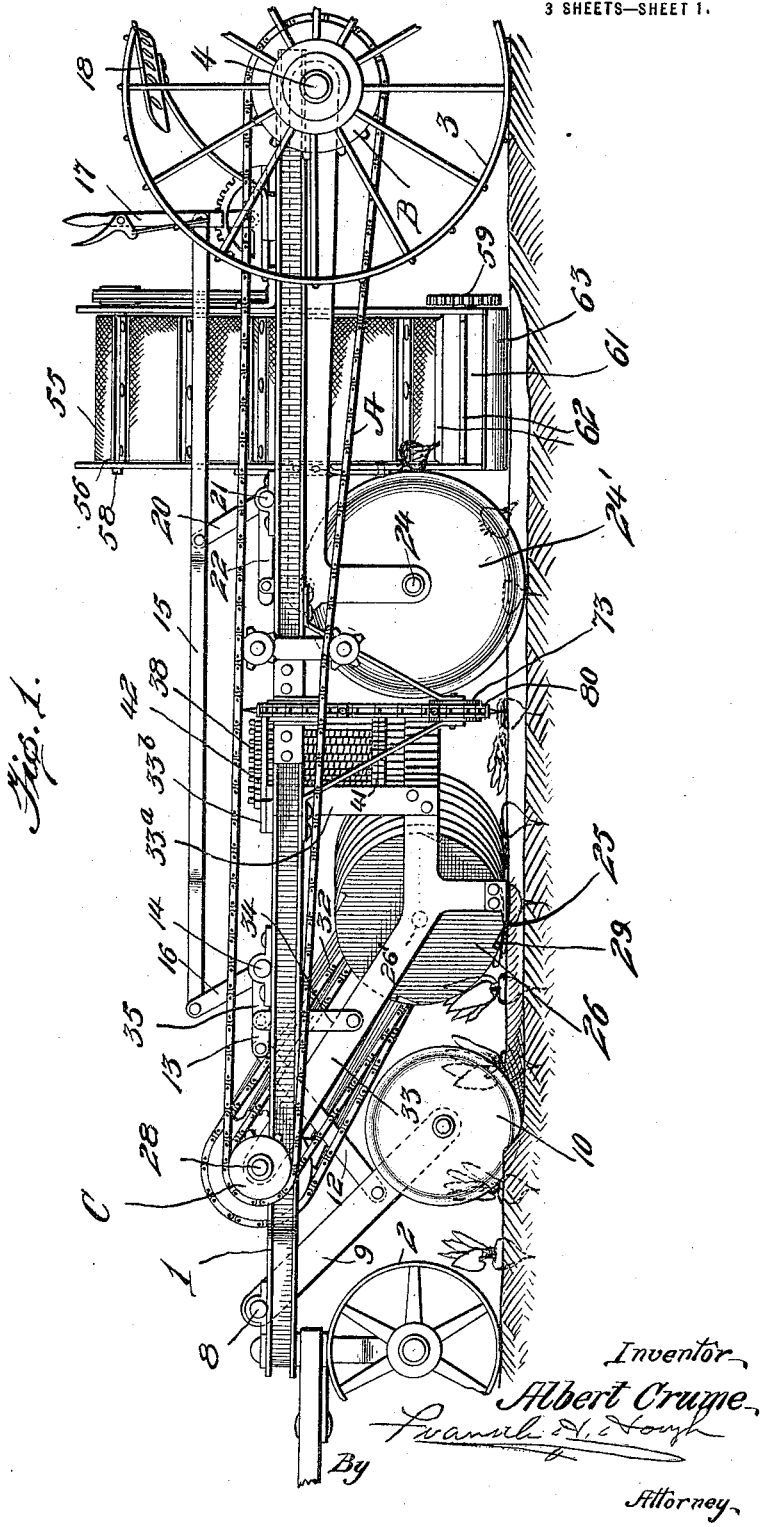

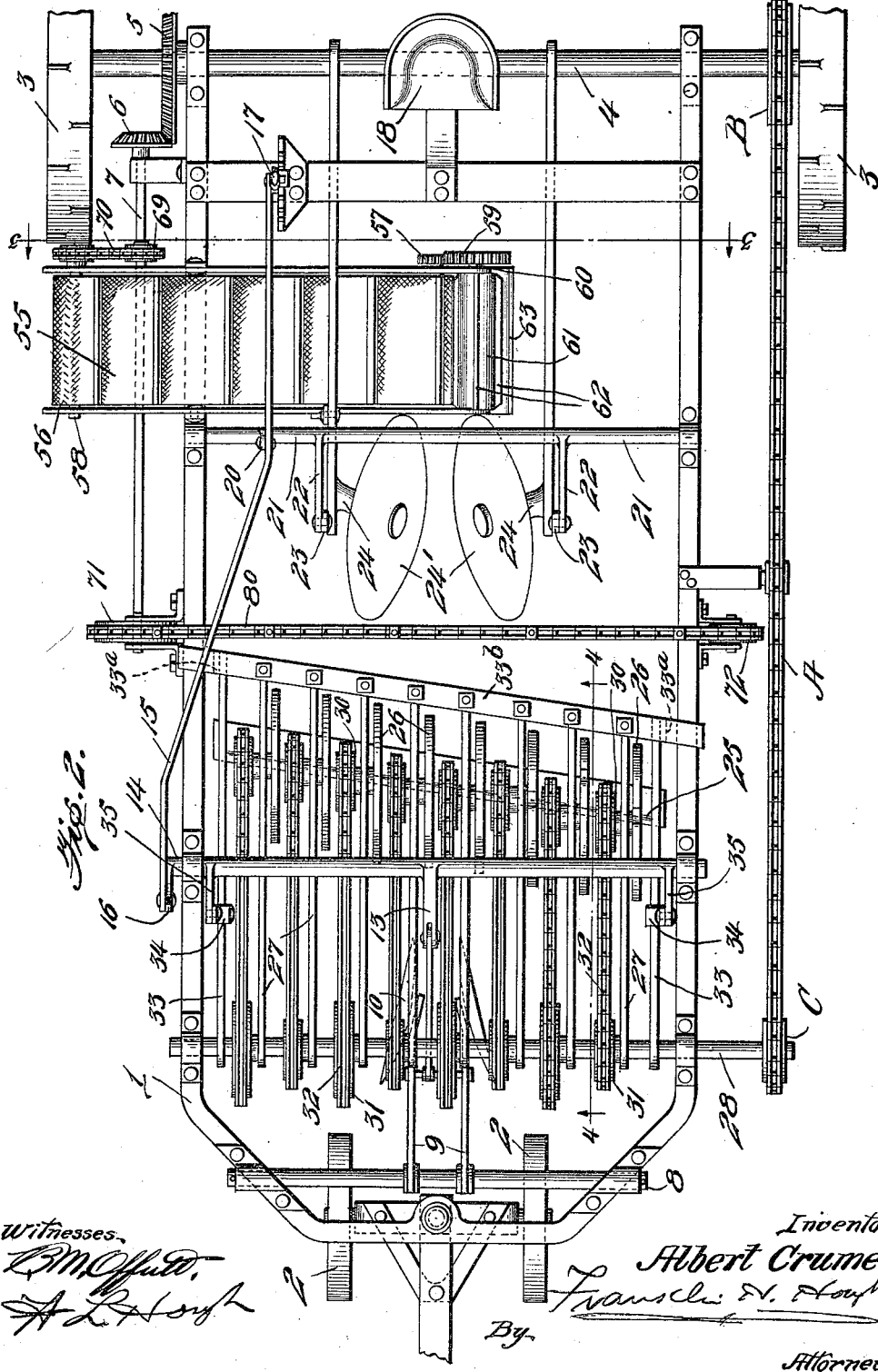

A. CRUME.
BEET HARVESTER.
APPLICATION FILED JUNE 25, 1918.
1,303,857.
Patented May 20, 1919.
3 SHEETS—SHEET 3.
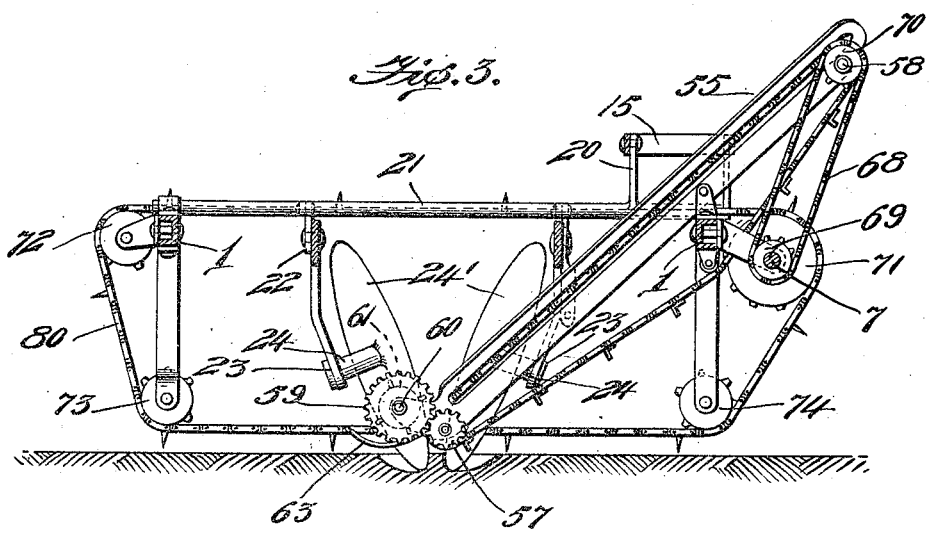
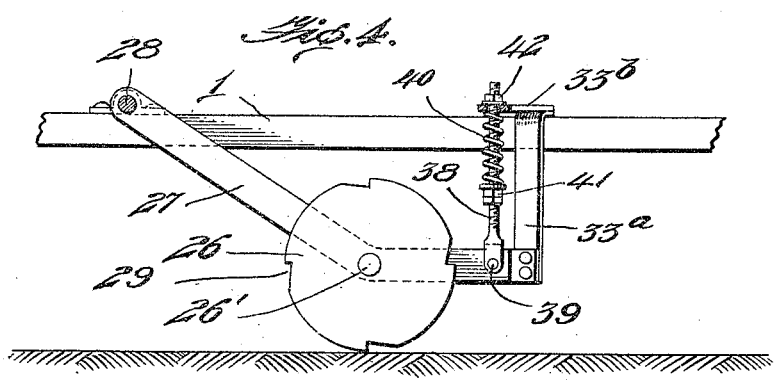

UNITED STATES PATENT OFFICE.

ALBERT CRUME, OF BAKERSFIELD, CALIFORNIA.

BEET-HARVESTER.

1,303,857.  Specification of Letters Patent.  Patented May 20, 1919.

Application filed June 25, 1918. Serial No. 241,845.

*To all whom it may concern:*

Be it known that I, ALBERT CRUME, a citizen of the United States, residing at Bakersfield, in the county of Kern and State of California, have invented certain new and useful Improvements in Beet-Harvesters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in beet harvesters and consists of a simple and efficient device of this nature adapted to cut the tops of beets, dig the same and elevate the beets by a conveyer to be deposited in a receptacle to receive the same.

My invention comprises a simple and efficient device of this nature, having various other details of construction, combinations and arrangements of parts which will be hereinafter fully described, shown in the accompanying drawings and then specifically defined in the appended claims.

My invention is illustrated in the accompanying drawings which, with the letters of reference marked thereon, form a part of this specification and in which:

Figure 1 is a side elevation of my beet harvester.

Fig. 2 is a top plan view.

Fig. 3 is a sectional view on line 3—3 of Fig. 2, and

Fig. 4 is a sectional view on line 4—4 of Fig. 2.

Reference now being had to the details of the drawings by numerals:

1 designates the frame of a harvester mounted upon suitable wheels 2 and 3, the latter of which has spurs about its circumference and serves as a driving wheel. Said wheels 3 are mounted upon a shaft 4 to which a master gear wheel 5 is keyed forming means for transmitting motion to the gear wheel 6, fixed to the shaft 7 journaled in suitable bearings upon the frame. Said frame has a shaft 8 journaled in bearings near the forward end thereof and which carries the two beams 9, each of which at its lower end carries a disk 10, which are disposed preferably with their convexed faces toward each other, and serve as means for cutting the ground upon either side of the row of beets, in the manner shown in Fig. 1 of the drawings, leaving a row of beets upon a ridge intermediate the cutaway portions. Said beams 9 are pivotally connected through the medium of the links 12 with the arms 13 fixed to the rock shaft 14, which latter is journaled in suitable bearings upon the frame, as shown clearly in Figs. 1 and 2 of the drawings. A bar 15 is pivotally connected to an arm 16 fixed to the shaft 14, and said bar 15 is connected to an operating lever 17 within convenient reach of the seat 18 upon the frame, and forms means whereby the said shaft 14 may be locked when it is desired to raise or lower the disks 10. Said bar, as shown clearly in Fig. 1 of the drawings, it will be noted, is pivotally connected through the medium of the link 20 with a rock shaft 21 upon the frame of the apparatus, and which rock shaft has arms 22 as shown in Fig. 2 of the drawings, which are pivotally connected at 23 to the stub shafts 24 upon which the two excavating disks 24' are journaled.

A cutting knife, designated by numeral 25, shown in Fig. 2 of the drawings, is diagonally disposed and is provided for the purpose of cutting the tops of the beets. A series of stub shafts 26' are mounted in the swinging bars 27, the latter being apertured at their forward ends to receive the shaft 28, which is journaled in bearings in the frame of the harvester. The disks 26 having notches 29 formed in their circumferences, as shown in Fig. 1 of the drawings, are adapted to push the tops of the beets down against the cutting knife 25 as the apparatus passes over the row. Said disks, it will be noted, are mounted one in advance of another, and each stub shaft 26 has a sprocket wheel 30 fixed thereto, about which and a sprocket wheel 31 a sprocket chain 32 passes, forming means whereby the disks may be rotated.

It will be noted upon reference to Fig. 2 of the drawings that the alternate sprocket wheels 31 mounted upon the shaft 28 are of different diameters and which cause the various disks with which they are connected to rotate with corresponding speed. This is for the purpose of loosening any foreign matter which might cling to the disks.

The beams 33 which support the knife 25 are pivotally mounted at their upper ends upon the shaft 28, and links 34 pivotally connect the bars 33 with the arms 35 fixed to the rock shaft 14 and afford means whereby the knife may be raised and lowered as the operating lever 17 is swung upon its pivot. This same movement also serves to raise or lower the entire series of disks 26 as the rear ends of the bars 33 are connected by means of the vertical bars 33$^a$ with a diagonally disposed cross piece 33$^b$, to which in turn are connected each of the swinging bars 27 through the medium of the threaded rods 38. Each of the stub shafts is mounted upon the shaft 28 at their upper ends. 38 is a rod pivotally connected at 39 to the bar 27, and 40 is a coiled spring mounted upon the rod 38 and bearing between the nuts 41 and 42, the tension of which spring is regulated by the nuts, and which spring permits the bar 27 to yield in the event of the disk passing over an obstruction.

An inclined endless conveyer, as shown in the drawings, and designated by numeral 55, passes over ribbed rollers 56, and 57 is a gear wheel fastened to the lower of the rollers of the conveyer, while the upper roller is mounted and rotates with the shaft 58. The gear wheel 57 meshes with the gear wheel 59 which is fixed to a shaft 60 rotating with the cylinder 61, which latter has a series of ribs 62 upon its circumference. Underneath the lower end of the conveyer is a pan 63 in which the beets which are excavated from the ground by the disks 24' are deposited, and which beets are wiped up by the rib 62 upon the cylinder 61, causing them to fall upon the endless conveyer up which they are carried.

The endless carrier consists of a chain, shown clearly in Fig. 3 of the drawings, and is driven by a sprocket chain 68 passing about the sprocket wheels 69 and 70, the latter being fixed to the shaft 58. The endless chain 80 passes about sprocket wheels 71 and 72, 73 and 74, and is driven by the shaft 7 and is provided with fingers upon the links thereof and serves as a means for carrying the tops laterally, so that they will not be caught up by the excavating disks 24', which remove the beets from the ground and deposit the same in the pan from which they are removed by the ribs 62 of the cylinder 61.

In operation, when the apparatus is driven by any power, the disks 10 will cut furrows upon either side of the row of beets, leaving the same upon a ridge, and as the disks 25 come in contact with the tops of the beets, said tops will be thrown down against the edge of the inclined knife, causing a draw-cut which will sever the tops from the beets, after which the tops will be thrown to one side by the teeth upon the endless chain 80. As the disks 24' rotate at the angle shown, they will root up the beets and deposit the same upon the pan underneath the cylinder 61, and the beets will be elevated by the endless conveyer and may be deposited in a receptacle, or other place provided for them.

Through the medium of the operating lever, the various parts may be raised into inoperative positions, as will be readily understood.

What I claim to be new is:

1. In a beet harvester, the combination with a truck, a frame pivotally mounted upon the truck, a knife carried by said frame, a series of pivotal bars, stub shafts carried thereby, notched disks fixed one to each of said stub shafts, means for driving the latter, and lever actuated means for simultaneously raising and lowering said bars and frame.

2. In a beet harvester, the combination with a truck, a shaft journaled thereon, a frame pivotally mounted upon the shaft, said frame having a cross-piece which is apertured, bars pivotally mounted upon the shaft and having rods pivotally connected thereto and passing through apertures in said cross-piece, a spring upon each rod, nuts upon the latter between which and the cross piece said springs bear, stub shafts carried by said bars, notched disks mounted one upon each stub shaft, gear mechanism for rotating the stub shafts, and lever actuated mechanism for simultaneously raising and lowering the frame and bars.

In testimony whereof I hereunto affix my signature in presence of two witnesses.

ALBERT CRUME.

Witnesses:
 IRENE R. WILSON,
 W. C. WREST.

Copies of this patent may be obtained for five cents each, by addressing the "Commissioner of Patents, Washington, D. C."